L. E. McQUITTY.
CORN PLANTER.
APPLICATION FILED APR. 21, 1909.
939,853.
Patented Nov. 9, 1909.
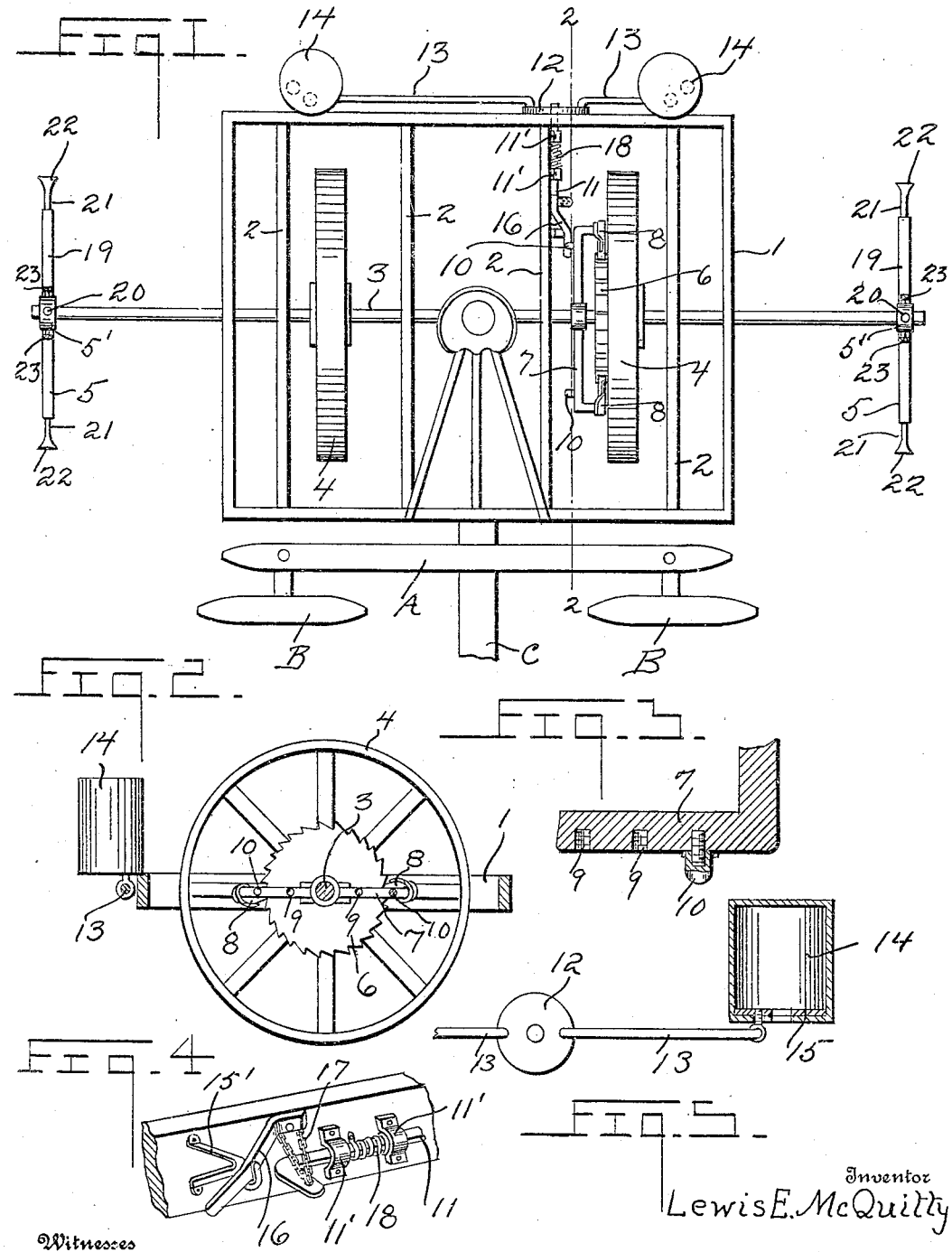
Witnesses
E. E. Johansen
E. L. Chandlee
Inventor
Lewis E. McQuitty
By Woodward & Chandlee
Attorneys

UNITED STATES PATENT OFFICE.

LEWIS E. McQUITTY, OF MULVANE, KANSAS.

CORN-PLANTER.

939,853.     Specification of Letters Patent.     Patented Nov. 9, 1909.

Application filed April 21, 1909. Serial No. 491,235.

*To all whom it may concern:*

Be it known that I, LEWIS E. McQUITTY, a citizen of the United States, residing at Mulvane, in the county of Sumner and State of Kansas, have invented certain new and useful Improvements in Corn - Planters, of which the following is a specification.

This invention relates to corn planters, and the primary object is to produce a machine of this class from which the seed is automatically dropped at pre-determined intervals.

Another object is to provide a tripping mechanism secured to the shaft or axle of the machine which may be adjusted so that the seed boxes can be opened at longer or shorter intervals if desired.

Another object is to provide means for displacing the soil to form a guiding mark.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a plan view of my improved corn planter, Fig. 2 is a longitudinal view on the line 2—2 of Fig. 1, Fig. 3 is a detached sectional view through one end of the tripping arm, Figs. 4 and 5 are detailed views of the seed box operating mechanism.

Referring now to the drawings, 1 indicates a rectangular frame preferably constructed of angle bar steel provided with the braces 2. A transverse shaft or axle 3 is supported in the frame and carries the ground wheels 4. Also mounted for rotative movement with the shaft are the arms 5, extending on either side thereof, the purpose of which will be hereinafter described. Secured to the side of one of the ground wheels is the ratchet 6, and secured upon the shaft 3 are the tripping arms 7, the extremities of which are bent at right angles and carry spring pressed dogs 8 normally engaged with the teeth of the ratchet. Any tendency of the tripping arms to move longitudinally upon the shaft, due to the vibration of the machine is thus overcome. These arms are provided with a series of screw threaded sockets 9 into which are adapted to be screwed the outwardly projecting lugs 10 the ends of which are preferably rounded.

Upon the side of one of the braces 2 is mounted the bell crank lever 11 having at its outer end the disk 12. On either side of the center of this disk is connected the rod 13 which extends to the seed box 14 and operates the plate 15 movably secured in the bottom thereof. Pivoted in the outer end of the bracket 15′ adjacent to the inner end of the lever 11 is a substantially Z-shaped bar 16, the outer end of which is connected by means of a short length of chain 17 with the end of the lever 11. A coiled spring 18 is disposed upon the lever between the bearings 11′ and has one of its ends secured to the brace bar 2 the other end being fastened to the lever 11. The inner end of the bell crank is engaged at each revolution of the wheel 4 by the lugs 10 carried by the tripping arm, and turns the disk 12 a sufficient distance for the oscillating of the seed plate 15 and a similar opening in the bottom of the seed box to register thus dropping the seed. The coiled spring 18 returns the lever to its normal position so that the lugs 10 will always engage with the crank end thereof, as the arms 7 are sufficiently long to permit of such engagement when the lugs are in any of the sockets. It will be seen also that by this construction an intermittent operation of the bell crank lever and consequently of the plate 15 is obtained.

The arms 7 may be rotated upon the shaft 3 by disengaging the dogs 8 from engagement with the ratchet 6, and the time at which the lugs 10 will engage the lever 11 can thus be regulated at the will of the operator without the necessity of raising the frame of the machine. As the lugs 10 are transversely adjustable in the arms 7, it will be seen that the period of their engagement with the bar 16 may be so regulated that the seed boxes are held in open position for just the proper length of time to deposit a pre-determined amount of seed.

For the purpose of forming a depression in the soil at intervals to obtain a suitable guiding mark, I have provided the arms 5, secured by the central hub 5′ to the shaft 3.

These arms comprise the tubular portion 19 in which is adjustably secured, by means of the set screws 20, the rods 21, the ends of which are flared as at 22. The arms 5 are also adjustable upon the shaft 3 to secure the proper relative position of the flared ends 22 with the lugs 10 and are held in such adjusted position by means of the set screw 23 which extends through the hub 5' and engages the shaft 3.

The usual draft bar A, swingletrees B, and tongue C are employed.

From the above description the many advantages and operation of my improved planter will be obvious. At each revolution of the ground wheels the seed valves will be operated twice by reason of the lugs 10 carried by the tripping arms engaging the bell crank lever 11, and at the same time a depression will be formed in the soil opposite the point at which the seed is deposited. The adjustability of the tripping arms and the marking arms allows of the spacing of the indicating point at the will of the operator. While these arms operate in unison there is always a depression to indicate the point at which the seed was deposited whereby the rows may be kept in alinement.

My corn planter is very simple and inexpensive in construction, positive in its operation, and wholly automatic, thus obviating the liability of disarrangement of the parts as is the case in machines of this class where the constant manipulation of levers is necessary.

Having thus described my said invention what I claim as new and desire to obtain by United States Letters Patent is:

1. In a machine of the class described, the combination with a rectangular frame, of traction wheels revolubly mounted upon a shaft supported in said frame, a ratchet carried by one of said wheels, seed receptacles supported on said frame, tripping arms secured to said shaft and having their ends disposed at right angles, said arms having spring pressed dogs adapted to engage with said ratchet, outwardly extending adjustable lugs on said arms, a bell crank lever mounted in said frame, a disk on the outer end of said lever, and rods pivotally secured to said disk and adapted to open said seed receptacles when the crank arm of the lever is engaged by said lugs.

2. In a machine of the class described, the combination with a rectangular frame, of traction wheels revolubly mounted in said frame, a ratchet carried by one of said wheels, seed receptacles supported upon said frame, tripping arms having their ends disposed at right angles and carrying means engaging with said ratchet to adjust said arms, outwardly extending transversely adjustable lugs on said arms, a bell crank lever mounted in bearings on said frame, a coiled spring disposed upon said lever between said bearings, a bar pivoted upon a bracket secured to said frame, a chain connecting one end of said bar with said lever, a disk on the outer end of said lever, and rods pivotally secured to said disk and adapted to open said seed receptacles when the end of said bar is engaged by said lugs.

3. In a machine of the class described, the combination with a rectangular frame, of traction wheels revolubly mounted upon a shaft supported in said frame, a ratchet carried by one of said wheels, seed receptacles supported upon said frame, radially extending tripping arms mounted on said shaft, said arms having their extremities angularly extended, spring pressed pawls carried by the extremities of said arms engaging with said ratchet, a bell crank lever mounted in bearings on said frame, a coiled spring disposed upon said lever between said bearings, a bar pivotally mounted on said frame, a chain connecting one end of said bar with said lever, transversely adjustable lugs carried by said tripping arms adapted to engage with the inner end of said bar to rotate said lever, a disk on the outer end of said lever, rods pivotally secured to said disk adapted to open said seed receptacles when the end of said bar is engaged by said lug, and radially adjustable marking arms secured to the ends of said shaft.

In testimony whereof I affix my signature, in presence of two witnesses.

LEWIS E. McQUITTY.

Witnesses:
A. HOFBAUER,
J. D. BYRNE.